United States Patent Office 3,646,097

Patented Feb. 29, 1972

3,646,097

N,N-DI-(POLYHALOVINYLTHIO) CARBOXAMIDES

Lawrence E. Stevick, San Francisco, Calif., assignor to Chevron Research Company, San Francisco, Calif.

No Drawing. Filed Apr. 29, 1969, Ser. No. 820,316
Int. Cl. C07c *119/18*
U.S. Cl. 260—453 R 5 Claims

ABSTRACT OF THE DISCLOSURE

N,N-di-(polyhalovinylthio) carboxamides of the formula:

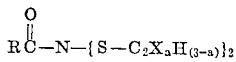

wherein R is hydrogen or a hydrocarbyl radical of 1 to about 10 carbon atoms which has 0 to about 3 halogen substituents of atomic number 17 to 35, X is halogen of atomic number 17 to 35 and $a$ is 2 or 3 the $$S—C_2X_aH_{(3-a)}$$

indicating a polyhalovinylthio group. These carboxamides are fungicidal, algicidal and nematocidal.

FIELD OF INVENTION

This invention concerns N,N-di-(polyhalovinylthio) carboxamides and their use as pesticides.

INVENTION DESCRIPTION

The novel carboxamides of the present invention may be represented by the formula:

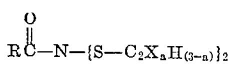

wherein R is hydrogen or a hydrocarbyl radical of 1 to about 10 carbon atoms which has 0 to about 3 halogen substituents of atomic number 17 to 35, X is halogen of atomic number 17 to 35 and $a$ is 2 or 3. The polyhalovinylthio groups bound to the nitrogen atom may be the same or different. Preferably X is chlorine, $a$ is 3, R is hydrogen or a hydrocarbyl radical of 1 to 8 carbon atoms which is free of aliphatic unsaturation and has 0 to 2 chloro substituents and the polyhalovinylthio groups are identical.

Representative polyhalovinyl groups which $$—C_2X_aH_{(3-a)}$$

may represent are trichlorovinyl, 1,2-dichlorovinyl, 2,2-dichlorovinyl, tribromovinyl, 2,2-dibromovinyl, 1,2-dibromovinyl, 2 - bromo-2-chlorovinyl-, 1-bromo-2,2-dichlorovinyl and the like.

Organic groups which R in the above formula may represent are alkyl, alkenyl, alkynyl, cycloalkyl, cycloalkenyl and aryl (including aralkyl and alkaryl). The aryl groups will usually be mononuclear. Specific examples of such groups are methyl, ethyl, isopropyl, n-butyl, propenyl, propynyl, sec. butyl, amyl, hexyl, octyl, decyl, 3-methylamyl, cyclobutyl, cyclohexyl, cyclooctyl, p-methylcyclohexyl, phenyl, tolyl, xylyl, cumyl, benzyl, and the like. Halo-substituted hydrocarbyl radicals which R may represent include chloroalkyl, bromoalkyl, chlorocycloalkyl, bromocycloalkyl, bromoaryl and chloroaryl. Specific examples of such halo-substituted radicals are chloromethyl, 2-chloroethyl, 3-chloropropyl, 4-chloroamyl, 6-chlorohexyl, p-chlorocyclohexyl, 2,6 - dichlorocyclohexyl, 2,6 - dibromocyclohexyl, p-bromocyclohexyl, p-chlorophenyl, 2,6 - dibromophenyl and 2,4,6-trichlorophenyl.

Typical carboxamides represented by the above formula are

N,N-di-(trichlorovinylthio) formamide,
N,N-di-(2,2-dichlorovinylthio) formamide,
N,N-di-(tribromovinylthio) formamide, N,N-di-(1,2-dichlorovinylthio) formamide,
N-2,2-dichlorovinylthio-N-trichlorovinylthio formamide,
N-2,2-dibromovinylthio-N-1,2-dichlorovinylthio formamide,
N-1-chloro-2-bromovinylthio-N-trichlorovinylthio formamide,
N,N-di-(tribromovinylthio) acetamide,
N,N-di-(1,2-dichlorovinylthio) acetamide,
N,N-di-(1-bromo-2-chlorovinylthio) acetamide,
N-1,2-dibromovinylthio-N-trichlorovinylthio acetamide,
N,N-di-(trichlorovinylthio) acetamide,
N,N-di-(2-bromo-2-chlorovinylthio) acetamide,
N,N-di-(tribromovinylthio) chloroacetamide,
N,N-di-(2-bromo-2-chlorovinylthio) propionamide,
N,N-di-(1,2-dibromovinylthio) propionamide,
N,N-di-(2,2-dichlorovinylthio) propionamide,
N,N-di-(2-bromo-2-chlorovinylhtio) propionamide,
N-2,2-dichlorovinylthio-N-trichlorovinylthio propionamide,
N-1-chloro-2-bromovinylthio-N-tribromovinylthio propionamide,
N,N-di-(trichlorovinylthio) 3,3-dichloropropionamide,
N,N-di-(2,2-dichlorovinylthio 2,3-dibromopropionamide,
N,N-di-(1,2-dichlorovinylthio) butyramide,
N,N-di-(2-bromo-2-chlorovinylthio) pentanamide,
N,N-di-(trichlorovinylthio) 3,4,5-trichloropentanamide,
N,N-di-(tribromovinylthio) hexanamide,
N,N-di-(2-bromo-2-chlorovinylthio) 5-bromohexanamide,
N,N-di-(trichlorovinylthio) heptanamide,
N,N-di-(2,2-dichlorovinylthio) 6,7-dichloroheptanamide,
N,N-di-(trichlorovinylthio) actanamide,
N-2,2-dibromovinylthio-N-2,2-dichlorovinylthio 3,5,7-tribromooctanamide,
N,N-di-(trichlorovinylthio) decanamide,
N,N-di-(1,2-dibromovinylthio) 10-chlorodecanamide,
N,N-di-(trichlorovinylthio) undecanamide,
N,N-di-(1-chloro-2-bromovinylthio) undecanamide,
N,N-di-(trichlorovinylthio) acrylamide,
N,N-di-(trichlorovinylthio) 3-chloroacrylamide,
N,N-di-(trichlorovinylthio) crotonamide,
N,N-di-(2,2-dichlorovinylthio) 2-ethylacrylamide,
N,N-di-(trichlorovinylthio) 3-hexenamide,
N,N-di-(trichlorovinylthio) 3-decenamide,
N,N-di-(trichlorovinylthio) propiolamide,
N,N-di-(trichlorovinylthio) 3-butynamide,
N,N-di-(trichlorovinylthio) cyclooctancarboxamide,
N-2,2-dichlorovinylthio-N-tribromovinylthio 3,4-dichlorocyclohexanecarboxamide,
N,N-di-(trichlorovinylthio) 4-bromocyclohexanecarboxamide,
N-1-bromo-2,2-dichlorovinylthio-N-1-chloro-2-bromovinylthio 2-chlorocyclobutanecarboxamide,
N,N-di-(trichlorovinylthio) cyclohexenecarboxamide,
N-2-bromo-2-chlorovinylthio-N-trichlorovinylthio cyclohexenecarboxamide,
N,N-di-(1-chloro-2-bromovinylthio) benzamide,
N,N-di-(2,2-dichlorovinylthio) benzamide,
N,N-di-(1-chloro-2-bromovinylthio) benzamide,
N-2,2-dichlorovinylthio-N-trichlorovinylthio benzamide,
N,N-di-(trichlorovinylthio) 4-chlorobenzamide,
N-2,2-dichlorovinylthio-N-tribromovinylthio 2,6-dibromobenzamide,
N,N-di-(trichlorovinylthio) 2,4,5-trichlorobenzamide,
N,N-di-(2,2-dichlorovinylthio) 2-phenylacetamide,
N-2,2-dibromovinylthio-N-trichlorovinylthio 2-(4-chlorophenyl)acetamide,
N,N-di-(trichlorovinylthio) p-toluamide,
N,N-di-(2,2-dichlorovinylthio) 4-ethylbenzamide, and
N,N-di-(1,2-dibromovinylthio) 2-bromo-4-toluamide.

The carboxamides of this invention may be prepared by reacting a sulfenyl halide with an unsubstituted carboxamide. This reaction is illustrated by the following chemical equation:

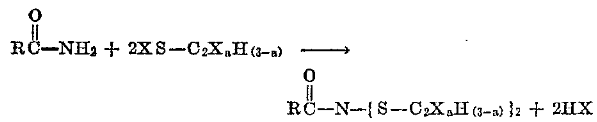

where R, X and $a$ are as previously defined. It is desirable to carry out this reaction in the presence of inert solvents such as the common aliphatic and aromatic hydrocarbon solvents, e.g., hexane, heptane, benzene, toluene, xylene, etc., halogenated hydrocarbon solvents, e.g., methylene chloride and chloroform, and the like. The reaction temperature is, in general, not critical and will usually be in the range of about −20 to about 50° C., preferably about 0 to 20° C. Likewise, the pressure is not critical and will usually be atmospheric or autogenous. It is desirable to use stoichiometric proportions of the reactants or a slight excess of the amide reactant.

It is necessary to have a mild, basic halogen halide acceptor present in order to introduce the second polyhalovinylthio group onto the nitrogen. Thus, a molar amount of sulfenyl halide could be reacted with the amide reactant, the hydrogen halide removed, acceptor added and a second molar amount of sulfenyl halide added. Alternatively, enough acceptor to take care of all hydrogen halide formed could be initially added to the reaction vessel. Soluble tertiary amines such as pyridine and trialkylamines, e.g., triethylamine and tripropylamine are preferred acceptors. Acceptors which are strong enough to react with the sulfenyl halide reactant should be avoided.

Carboxamides of this invention may also be prepared by dehydrohalogenating corresponding N,N - di - (polyhaloalkylthio) carboxamides. For instance, N,N-di-(tetrachloroethylthio) carboxamides may be dehydrochlorinated to produce N,N-di-(trichlorovinylthio) carboxamides. This dehydrohalogenation will normally be carried out at low temperatures, usually about 0 to 40° C. and in the presence of solvents such as benzene, toluene, ether, methylene chloride, acetonitrile and chloroform. Mild dehydrohalogenating agents such as tertiary amines (trialkyl amines, pyridine, etc.) or alkali metal carbonates will normally be employed. Triethylamine is a preferred agent.

EXAMPLES

The following example describes a method which may be used to prepare the carboxamides of this invention. This example is not intended to limit the invention described herein. Percentages are by weight.

Example 99 g. of trichlorovinylsulfenyl chloride and 500 ml. hexane were placed in a vessel cooled to 0° C. 33.8 g. formamide were added. 53.5 g. of triethylamine dissolved in 50 ml. hexane was then added to the solution dropwise over 5–8 minutes. During this addition the vessel was cooled in a Dry Ice-isopropanol bath to maintain the temperature at ~0° C. The reaction mixture was then stirred vigorously at 0–7° C. for 2½ hrs. This reaction mixture was then filtered, washed three times with ice water, dried over $MgSO_4$, filtered again and stripped at 35° C. under vacuum to give 64.5 g. N,N-di-(trichlorovinylthio) formamide. This compound, a red-brown oil, had the following Cl and S analysis:

S.—Calc: 17.41%; found: 17.83%.
Cl.—Calc: 57.8%; found: 58.05%.

UTILITY

The N-polyhalovinylthio formamide and lower alkyl carboxamides of this invention have biological activity against a variety of organisms such as fungi, algae, bacteria and nematodes.

The nematocidal activity of a representative compound of this invention, N,N-di-(trichlorovinylthio) formamide, was determined by testing it by the following method.

A 0.38 ml. portion of a 3% acetone solution of N,N-di-(trichlorovinylthio) formamide was diluted with 1 ml. acetone. The resulting solution was homogeneously mixed with 20 cc. of vermiculite. The treated vermiculite was then mixed homogeneously with 750 g. of soil, dry weight basis, which was severely infested with free living nematodes (mixed culture of *Meloidogyne javanica* and *Meloidogyne incognita*). This mixing gave a concentration of approximately 15 parts of the formamide per million parts of soil. This treated soil was stored for 4 days at 65–75° F. It was then divided equally into 3 parts, each of which was put into a separate pot and kept for another 3 days. A 3-week old tomato (v. Bonny Best) seedling was then transplanted into each pot and incubated for 13 days under greenhouse conditions. After this period they were removed and the soil was washed from their roots. The nematocidal effectiveness of the formamide was determined by observing each plant for signs of nematode invasion (number of galls formed, stunting, etc.). This formamide provided 99% control on a 0 to 100 basis; 0 indicating no control, 100 indicating complete control.

As illustrated above, the compounds of this invention may be used to control plant-parasitic nematodes by exposing them to a toxic amount of the carboxamide. Thus, these carboxamides will normally be applied to nematode-infested soil at dosages in the range of 3 to 40 lbs. per acre. They may be applied as liquid formulations by spraying or injection. The liquid formulations of these carboxamides may be solutions, dispersions, or emulsions. Typical solvents which may be used are aromatics such as xylene, toluene and benzene, ketones such as cyclohexanone and the like. These liquid formulations will usually contain a wetting agent to facilitate the carboxamide's penetration into the soil and generally enhance its effectiveness. They may also be applied as solid formulations containing carriers such as soil, sawdust, clay and the like. When used as a solid, these carboxamides will usually be plowed into the soil. Following their application to the soil, the soil will be watered to disperse the carboxamide below ground level.

Carboxamides of this invention are also useful for controlling microbiological organisms such as algae, bacteria, molds and aquatic weeds which foul aqueous industrial effluents and cooling streams, such as those occurring in the paper and food processing industries. They may also be used to control such organisms in other aqueous bodies such as lakes, streams, canals, pools and the like. When so used, a biocidal quantity of one or more of the carboxamides of this invention is added to the aqueous growth environment of the organisms. Usually, this dosage will range between about 0.1 and 50 p.p.m. In any given instance, the optimum dosage will depend upon the particular organism and aqueous body involved. For instance, when used to control algae, these carboxamides will usually be employed at concentrations of about 0.1 to 10 p.p.m. In terms of pounds of carboxamide per acre of water one foot deep 0.1 to 10 p.p.m. is equal to about 0.3 to 30 lbs. per acre of water one foot deep. These carboxamides may be applied to the aqueous growth environments of such organisms as dispersible powders or insolution with water-miscible solvents.

N,N-di-(trichlorovinylthio) formamide was tested as an algicide by the following method.

An acetone solution of equal parts of N,N-di-(trichlorovinylthio) formamide and a surfactant was prepared. This solution was mixed with a nutrient broth in a quantity sufficient to give a concentration of 2 p.p.m. formamide. Four replicate 150 ml. specimen cups were filled with this mixture. 350–500 mg. of Euglena was added to each specimen cup and the cups were then placed in an environment chamber for incubation. The cups were observed periodically for algae growth. The algicidal effectiveness of this formamide was determined based on a final observation of algae growth after 10 days. This formamide gave 100% algicide control on a 0 to 100 basis—0 indicating no effectiveness; 100 indicating complete effectiveness.

N,N-di-(trichlorovinylthio) formamide was also used to control fungi such as *Pythium ultimum, Fusarium oxysporum f. phaseoli, Helminthosporium sativum, Monilinia fructicola* and *Alternaria solani,* and bacteria such as *Erwinia carotovora, Pseudomonas syringae, Agrobacterium tumafaciens, Corynebacteria michiganense* and *Xanthomonas phaseoli.* When used as fungicides, or bactericides, the carboxamides of this invention will be formulated and applied in fungicidal or bactericidal, as the case may be, amounts by conventional art methods to fungi, bacteria or hosts which are subject to fungus or bacteria attack, especially vegetative hosts such as plants, plant seeds, paper and the like. They may be combined with inert liquids and solid carriers as powders, solutions or dispersions for such use.

Pesticidal formulations of the carboxamides of this invention may also contain stabilizers, spreading agents sticking agents, fillers, other compatible pesticides and the like.

I claim:

1. N,N-di-(polyhalovinylthio) carboxamide of the formula

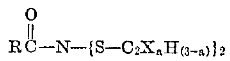

wherein R is hydogen or lower alkyl, X is halogen of atomic number 17 to 35 and *a* is 2 or 3.

2. The carboxamide of claim 1 wherein R is hydrogen or methyl.

3. The carboxamide of claim 1 wherein X is chlorine and *a* is 3.

4. The carboxamide of claim 3 wherein R is hydrogen or methyl.

5. The carboxamide of claim 1 wherein X is chlorine, *a* is 3 and R is hydrogen.

References Cited

UNITED STATES PATENTS

| | | | |
|---|---|---|---|
| 3,117,855 | 1/1964 | Richter | 71—88 |
| 3,154,468 | 10/1964 | Aichenegg et al. | 424—274 |
| 3,187,042 | 6/1965 | Richter | 71—98 |
| 3,344,153 | 9/1967 | Kühle et al. | 260—347.2 |
| 3,489,766 | 1/1970 | Weil et al. | 260—326 |

LEWIS GOTTS, Primary Examiner

G. HOLLRAH, Assistant Examiner

U.S. Cl. X.R.

71—66, 67, 98; 210—64; 260—402.5; 424—298